No. 651,297. Patented June 5, 1900.
J. CASHEN.
VEHICLE BRAKE.
(Application filed Mar. 9, 1900.)

(No Model.)

Witnesses
J. Cashen  Inventor
By his Attorneys.

UNITED STATES PATENT OFFICE.

JOHN CASHEN, OF MONTICELLO, IOWA.

VEHICLE-BRAKE.

SPECIFICATION forming part of Letters Patent No. 651,297, dated June 5, 1900.

Application filed March 9, 1900. Serial No. 8,043. (No model.)

*To all whom it may concern:*

Be it known that I, JOHN CASHEN, a citizen of the United States, residing at Monticello, in the county of Jones and State of Iowa, have invented a new and useful Vehicle-Brake, of which the following is a specification.

The invention relates to improvements in vehicle-brakes.

One object of the present invention is to improve the construction of vehicle-brakes and to provide a simple, inexpensive, and efficient device designed to be mounted on the rear axle of a running-gear and adapted to be dropped downward in rear of the hind wheel to prevent the vehicle from backing, and another object of the invention is to enable the device to be readily adjusted to suit the size of a vehicle-wheel.

The invention consists in the construction and novel combination and arrangement of parts hereinafter fully described, illustrated in the accompanying drawings, and pointed out in the claims hereto appended.

Figure 1:
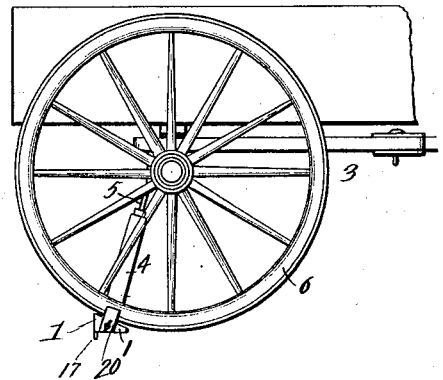
Figure 2:
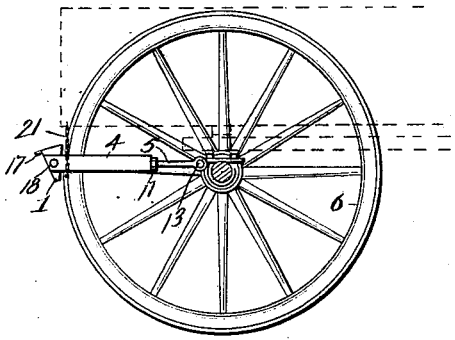
Figure 3:
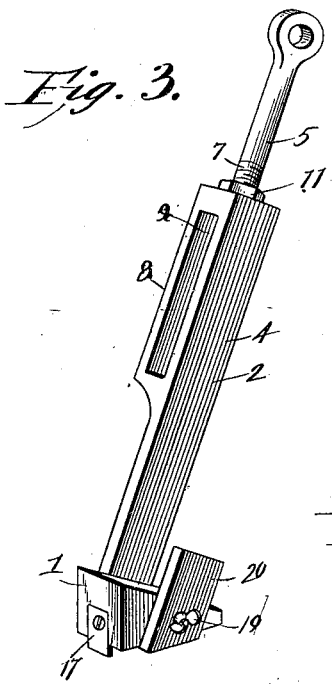
Figure 4:
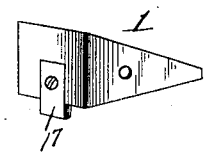
Figure 5:
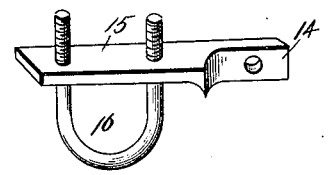
Figure 6:
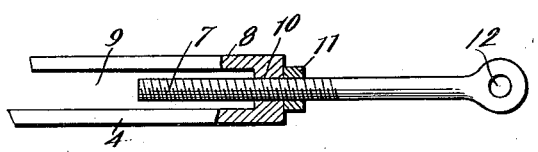

In the drawings, Figure 1 is a side elevation of a vehicle-brake constructed in accordance with this invention and shown applied to a vehicle, the brake being in operative position. Fig. 2 is a similar view, the vehicle being in section and the brake being raised. Fig. 3 is a detail perspective view of the device. Fig. 4 is a detail view of the brake-shoe. Fig. 5 is a detail view of the axle-clip. Fig. 6 is a detail sectional view illustrating the manner of securing the rod or stem to the bar.

Like numerals of reference designate corresponding parts in all the figures of the drawings.

1 designates a tapering or approximately-triangular brake-shoe secured to the outer end of an arm 2, which is connected with the rear portion of a vehicle 3 and which is composed of a bar 4 and a rod or stem 5, adjustably secured to the inner end of the bar, whereby the length of the arm may be varied to suit the diameter of a wheel 6. The rod 5 has an inner threaded portion 7, and the inner portion 8 of the bar is enlarged and is provided with a longitudinal slot or opening 9, terminating short of its inner end and receiving the inner portion of the rod or stem 5. The inner end of the bar is provided with a threaded aperture 10, through which the threaded portion 7 of the rod or stem extends, and the parts are clamped at any desired adjustment by means of a nut 11, arranged on the exterior of the inner end of the bar and engaging the same; but any other suitable means may be employed for effecting this result. The rod is provided with an eye 12, which is pivoted by a bolt or other suitable fastening device 13 to an arm 14 of a plate 15 of a clip 16. The clip embraces the rear axle of the vehicle, and a clip-plate 15 extends rearward therefrom, the extension or arm 14 being perforated for the reception of the pivot 13. By this construction the arm 2, which carries the brake-shoe, is eccentrically pivoted with relation to the wheel and is adapted to swing downward from the position shown in Fig. 2 to that illustrated in Fig. 1 to carry the brake-shoe at the back of the wheel and beneath the same, whereby any rearward movement of the vehicle will be checked, thereby enabling the vehicle to be stopped in climbing a hill, for resting the horses, or for any other purpose. When the arm 2 is swung upward to the position illustrated in Fig. 2, the brake-shoe is clear of the wheel, which is permitted to rotate freely. Also the brake-shoe when in this position tapers downwardly and is adapted to prevent excessive accumulation of mud on the vehicle-wheel.

The brake-shoe, which is preferably constructed of wood, is provided with a projection or spur 17, which is adapted to embed itself in the ground and prevent the brake-shoe from slipping. The projection or spur, which extends downward from the rear end of the brake-shoe when the device is arranged as illustrated in Fig. 1 of the accompanying drawings, consists of a metal plate secured to the butt-end of the brake-shoe in a recess thereof, as clearly illustrated in Fig. 4. When the brake-shoe is in engagement with the wheel, it presents an inclined face to the same, and its bottom face, which engages the ground, is disposed horizontally. The brake-shoe is secured to the outer end of the bar 4 by means of a bolt 18, provided with a thumb-nut 19, which also engages a plate 20, arranged at the outer face of the brake-shoe and extending inward toward the wheel and projecting beyond the tire thereof, whereby the device will be held against lateral movement. The bolt passes through a perforation of the plate or guard 20 and serves to secure the same and the brake-shoe to the outer end of the bar 4.

It will be seen that the device is exceedingly simple and inexpensive in construction, that it is adapted to be readily applied to a vehicle and to be adjusted to suit the size of a vehicle-wheel, and that it is capable of effectively checking the backward movement of the same.

Any suitable means may be employed for supporting the device in its raised or horizontal position, as illustrated in Fig. 2 of the drawings, and this means may consist of a chain 21, attached to the body of the vehicle. When the body of the vehicle is removed from the running-gear, a rod may be extended from the rear axle or the rear bolster to form a support for the device.

What is claimed is—

1. A device of the class described comprising an arm designed to be pivoted eccentrically of the vehicle-wheel, and capable of longitudinal adjustment to vary its length to suit the diameter of the wheel, a brake-shoe secured to the outer end of the arm, and a guard projecting from the brake-shoe and extending toward the wheel beyond the outer periphery thereof, substantially as and for the purpose described.

2. A device of the class described comprising an arm designed to be pivoted eccentrically of a wheel, and to extend rearward therefrom, the approximately-triangular brake-shoe arranged at the outer end of the arm and adapted when the latter is swung downward, to engage the wheel and the ground and present an inclined face to the wheel and a horizontal face to the ground, the projection or spur depending from the outer or rear face of the shoe, the plate 20 disposed parallel with the arm and arranged at the outer side face of the shoe, and a fastening device passing through the arm, the shoe and the plate and connecting the parts, substantially as described.

3. A device of the class described comprising a bar provided at its inner portion with a slot and having the threaded opening at its inner end, a rod having a threaded portion extending into the slot and engaging the screw-threads of the bar, and a brake-shoe mounted on the outer end of the bar, substantially as described.

4. A device of the class described comprising a clip having an extension and adapted to engage the rear axle of a vehicle, a rod pivoted to the extension of the clip, a bar adjustably connected with the rod, and a brake-shoe mounted on the outer end of the bar, substantially as described.

In testimony that I claim the foregoing as my own I have hereto affixed my signature in the presence of two witnesses.

JOHN CASHEN.

Witnesses:
 GEO. W. CURTIS,
 H. PUTNAM.